(No Model.)

C. RAIBLE.
VEGETABLE CUTTER.

No. 510,289. Patented Dec. 5, 1893.

WITNESSES:
F. McArdle.
C. Sedgwick.

INVENTOR
C. Raible
BY
Munn & Co
ATTORNEYS.

THE NATIONAL LITHOGRAPHING COMPANY,
WASHINGTON, D. C.

UNITED STATES PATENT OFFICE.

CONSTANTIN RAIBLE, OF OSKALOOSA, IOWA.

VEGETABLE-CUTTER.

SPECIFICATION forming part of Letters Patent No. 510,289, dated December 5, 1893.

Application filed July 11, 1893. Serial No. 480,122. (No model.)

*To all whom it may concern:*

Be it known that I, CONSTANTIN RAIBLE, of Oskaloosa, in the county of Mahaska and State of Iowa, have invented a new and Improved Vegetable-Cutter, of which the following is a full, clear, and exact description.

The invention relates to vegetable cutters such as shown and described in the United States Letters Patent No. 256,369, granted to me April 11, 1882.

The object of the present invention is to provide a new and improved vegetable cutter, which is simple and durable in construction, very effective in operation, and arranged to properly cut or slice the vegetables to any desired thickness.

The invention consists of certain parts and details and combinations of the same, as will be fully described hereinafter and then pointed out in the claims.

Reference is to be had to the accompanying drawings, forming a part of this specification, in which similar letters of reference indicate corresponding parts in all the figures.

Figure 1:
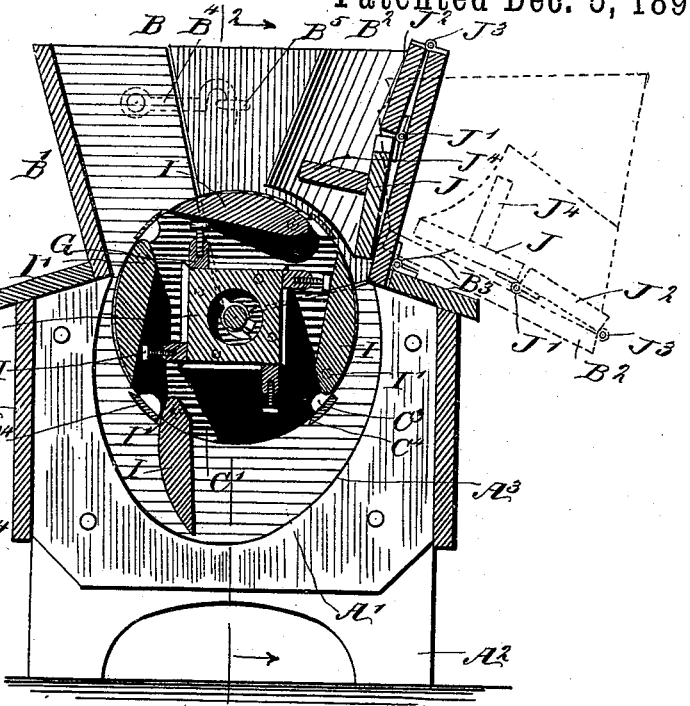
Figure 3:
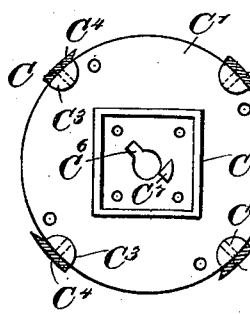
Figure 2:
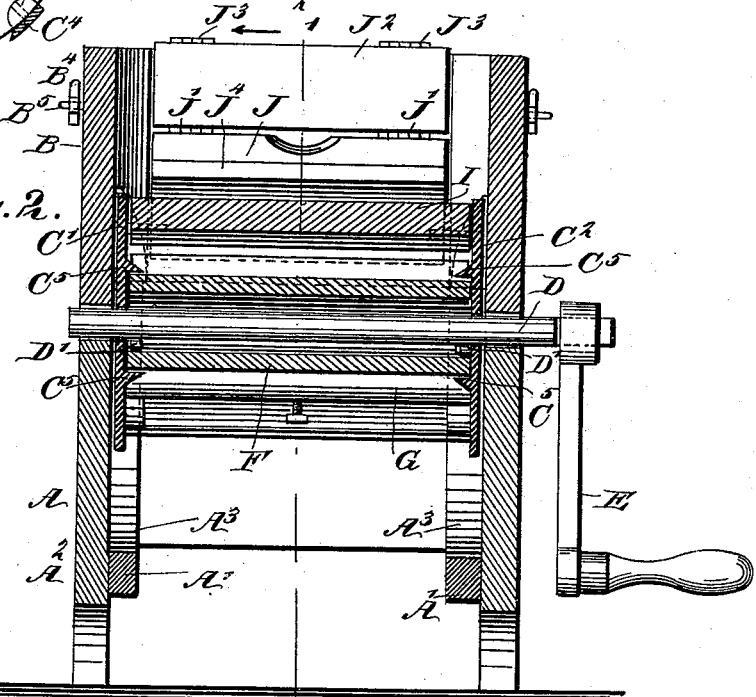

Figure 1 is a cross section of the improvement on the line 1—1 of Fig. 2. Fig. 2 is a sectional side elevation of the same on the line 2—2 of Fig. 1 and Fig. 3 is a face view of one of the heads of the knife cylinder with one of the knives in section.

The improved vegetable cutter is provided with a suitably constructed casing A, on the upper end of which is arranged a hopper B made in two sections B' and B², of which the section B' is integral with the casing A, and the other section B² is hinged at B³ to the inclined top of the casing A, so as to permit of opening this sectional hopper B² to obtain ready access to the knives, as hereinafter more fully described. The section B² is adapted to be fastened in place on the other section B' by means of hooks B⁴ fulcrumed on the section B' and engaging staples B⁵ on the hinged section B².

Into the lower end of the hopper B extends the knife cylinder C, held on a shaft D, journaled in suitable bearings arranged in the sides of the casing A, one outer end of the said shaft being provided with a crank arm E for conveniently turning the said shaft to revolve the knife cylinder C within the lower end of the hopper and the casing A. The knife cylinder C is provided with heads C' and C² formed on their opposing faces with lugs C³, on which are secured the ends of the knives C⁴ adapted to cut the vegetables contained in the hopper B. On the inner faces of the heads C' and C² are formed continuous ribs C⁵, into which is fitted a longitudinally extending hollow tube F, through which passes the shaft D, the said tube forming compartments within the knife cylinder C, one for each knife. The ends of the tube F are secured in place on the heads C' and C² by screws, to securely connect the heads with each other. The ribs C⁵ prevent outward movement of the tube, as the ends of the latter fit on the sides of the continuous ribs. The shaft D passes loosely through the heads C' and C², and is provided with lugs D' adapted to pass through corresponding notches C⁶ leading to the circular aperture for the passage of the shaft D. On the inner faces of the heads C' and C² are formed lugs C⁷ adapted to be engaged by the lugs D' at the time the shaft D is in the proper position, so that when the shaft is rotated the lugs D' engage the lugs C⁷ and thus rotate the knife cylinder with the shaft D. On the outside of the tube F are arranged the longitudinally extending bars G, in each of which screws a set screw H forming a rest for the corresponding hinged throat plate I, pivoted at I' to the heads C' and C² near the lugs C³ of the next adjacent knife. The free end of each throat plate extends close to the cutting edge of its corresponding knife C⁴, and by adjusting the corresponding set screw H the distance between the cutting edge and the free end of the throat plate can be increased or diminished to regulate the thickness of the slice to be cut from the vegetable. The throat plates I are adapted to swing open at the time the cylinder C is rotated, and the said throat plates pass into a lowermost position to permit the previously cut slices to drop out from the interior of the cylinder into a suitable receptacle placed within the casing below the cylinder. The throat plates I are guided, when swinging open or shut, by the guide plates A' attached to the sides A² of the casing A, and the inner edges A³ of the said guide plates are of oval shape so as to permit the throat plates to swing wide open when in a lowermost position and to assist in closing the throat plates when moved upward on the further rotation of the knife cylinder. Thus, at the time the throat plate again enters, at its hinged end I', the hopper B, the said throat plate is again closed by its free end resting on its corresponding set screw H.

The feeding apparatus is arranged in the hinged hopper section $B^2$, and is provided with a longitudinally extending board J connected by hinges J' with a second longitudinal board $J^2$ connected at its upper end by hinges $J^3$ with the top edge of one side of the hopper section $B^2$. From the lowermost board J extends inward the feed board $J^4$ arranged approximately at right angles to the board J, and serves to press the vegetables downward into contact with the periphery of the cylinder C to cause the knives $C^4$ thereon to cut the vegetables.

It will be seen that by the arrangement described, the entire periphery of the knife cylinder C is composed of the alternately arranged knives $C^4$ and hinged throat plates I, so that I am enabled to utilize the entire peripheral surface of the cylinder for knives and throat plates, whereby I am enabled to rapidly cut a large amount of vegetables without proportionately increasing the diameter of the cylinder.

By the especial arrangement of the guideways A' for the throat plates I, binding of the latter on the sides $A^2$ of the casing is entirely prevented, and the said throat plates open proportionately when nearing their lowermost position, to permit the slices to drop out of the cylinder, at the bottom thereof. The tube F prevents any of the slices from passing to the shaft and the bearings for the same, so that clogging of the shaft and cylinder is entirely prevented.

Having thus fully described my invention, I claim as new and desire to secure by Letters Patent—

1. In a vegetable cutter, the combination with a cutting cylinder having its periphery formed of alternately arranged knives and hinged throat plates, of adjustable stops for limiting the inward movement of the throat plates, substantially as shown and described.

2. A vegetable cutter provided with a knife cylinder comprising heads, a tube connecting the heads centrally with each other, knives secured on the peripheries of the said heads, and throat plates hinged to the said heads adjacent to the knives, substantially as shown and described.

3. A vegetable cutter provided with a knife cylinder comprising heads, a tube connecting the heads centrally with each other, knives secured on the peripheries of the said heads, throat plates hinged to the said heads adjacent to the knives, and means, substantially as shown and described, for adjusting the said hinged throat plates relative to the cutting edges of the knives to regulate the thickness of the slices, as set forth.

4. A vegetable cutter provided with a knife cylinder comprising two circular heads mounted on a shaft for revolving the cylinder, a tube centrally connecting the heads with each other and engaging continuous ribs on the opposing faces of the said heads, bars secured to the outside of the said tube, set screws screwing in the said bars, throat plates hinged on the said heads and adapted to rest with their free ends on the said set screws, and knives fastened to the said heads adjacent to the free ends of the said throat plates, substantially as shown and described.

5. In a vegetable cutter, the combination with a casing formed with guideways, of a knife cylinder mounted to revolve in the said casing and provided with fixed knives, and hinged throat plates adapted to engage the said guideways, substantially as shown and described.

6. A vegetable cutter provided with a feeding apparatus comprising two boards hinged together, one being hinged to the hopper, and a feed plate extending from the outermost hinged board, substantially as shown and described.

CONSTANTIN RAIBLE.

Witnesses:
W. G. JONES,
C. H. HORE.